(12) United States Patent
Parday et al.

(10) Patent No.: US 11,708,112 B2
(45) Date of Patent: Jul. 25, 2023

(54) FAST-SKI RAIL AND CROSSMEMBER SYSTEM FOR HIGH VOLTAGE COMPONENT PROTECTION

(71) Applicants: Kedar V Parday, Troy, MI (US); Krishnamurthy Hegde, Rochester Hills, MI (US); Saurabh V Joshi, Troy, MI (US); Rebecca L Tanguay, Troy, MI (US); Maximiliano P Larroquette, Rochester Hills, MI (US); Dennis J. Hauff, Jr., Richmond, MI (US); Michael J Martinez, Lake Orion, MI (US); Richard C Chiarcos, Rochester, MI (US)

(72) Inventors: Kedar V Parday, Troy, MI (US); Krishnamurthy Hegde, Rochester Hills, MI (US); Saurabh V Joshi, Troy, MI (US); Rebecca L Tanguay, Troy, MI (US); Maximiliano P Larroquette, Rochester Hills, MI (US); Dennis J. Hauff, Jr., Richmond, MI (US); Michael J Martinez, Lake Orion, MI (US); Richard C Chiarcos, Rochester, MI (US)

(73) Assignee: FCA US LLC, Auburn Hills, MI (US)

( * ) Notice: Subject to any disclaimer, the term of this patent is extended or adjusted under 35 U.S.C. 154(b) by 20 days.

(21) Appl. No.: 17/387,018

(22) Filed: Jul. 28, 2021

(65) Prior Publication Data
US 2023/0033710 A1 Feb. 2, 2023

(51) Int. Cl.
*B62D 21/15* (2006.01)
*B62D 21/03* (2006.01)
(Continued)

(52) U.S. Cl.
CPC ............... *B62D 21/15* (2013.01); *B60K 1/04* (2013.01); *B62D 21/03* (2013.01); *B62D 21/06* (2013.01); *B60K 2001/0438* (2013.01)

(58) Field of Classification Search
CPC .... B60K 1/04; B60K 2001/0438; B60K 6/28; B60K 1/00; B62D 21/15; B62D 21/03; B62D 21/152
(Continued)

(56) References Cited

U.S. PATENT DOCUMENTS 8,556,336 B2 * 10/2013 Yasuhara ............. B62D 27/023
296/193.07
8,602,454 B1 * 12/2013 Baccouche ............. B60K 1/04
180/68.5

(Continued)

FOREIGN PATENT DOCUMENTS

EP    1454815 A2    9/2004
EP    1640252 A1 *  3/2006 ............. B62D 21/10
FR    3081799 B1 *  7/2020

*Primary Examiner* — Paul N Dickson
*Assistant Examiner* — Caitlin Anne Miller
(74) *Attorney, Agent, or Firm* — Jeremy J. Klobucar

(57) ABSTRACT

A frame system for a vehicle including a high-voltage component that includes a pair of spaced apart primary rails that extend from a front of the vehicle toward a rear of the vehicle and a pair of longitudinally extending sills. An impact support rail extends outward from each of the primary rails, and connects each respective primary rail to one of the sills. A cross-member extends outward from each of the primary rails, and connects each respective primary rail to one of the sills, and a laterally extending frame support member extends between the sills at a location between the impact support rails and the cross-members. A pocket is collectively formed between each primary rail, the respective impact support rail, the respective sill, the respective cross-member, and the laterally extending frame support (Continued)

member, and the pocket is configured for receipt and protection of the high-voltage component.

16 Claims, 4 Drawing Sheets

(51) Int. Cl.
*B60K 1/04* (2019.01)
*B62D 21/06* (2006.01)

(58) Field of Classification Search
USPC .......................................... 180/271; 296/204
See application file for complete search history.

(56) References Cited

U.S. PATENT DOCUMENTS

| | | | | |
|---|---|---|---|---|
| 9,499,205 | B1* | 11/2016 | Elia | B60K 6/28 |
| 9,688,314 | B2* | 6/2017 | Ajisaka | B60K 15/073 |
| 9,944,173 | B2* | 4/2018 | Ajisaka | B60K 1/04 |
| 11,155,149 | B2* | 10/2021 | Ryu | B60K 15/063 |
| 2011/0168468 | A1* | 7/2011 | Taguchi | B60L 15/20 |
| | | | | 180/65.245 |
| 2020/0207198 | A1* | 7/2020 | Baccouche | B62D 21/157 |
| 2021/0178883 | A1* | 6/2021 | Kang | B62D 21/157 |

* cited by examiner

FAST-SKI RAIL AND CROSSMEMBER SYSTEM FOR HIGH VOLTAGE COMPONENT PROTECTION

FIELD

The present disclosure relates to a frame system for a vehicle having a configuration designed to protect high-voltage components of the vehicle.

BACKGROUND

In recent years, electric vehicles and hybrid vehicles have become more widespread. These vehicles are increasingly using a high number of high voltage components including, for example, a high voltage power inverter modules (PIM) and high voltage integrated DC modules (IDCM). Inasmuch as these components utilize a high voltage, it is important to try to protect these components from damage in the event of a vehicle impact. This is because these components are typically expensive, and because protecting these components can have a good and robust effect on high voltage battery shutdown and high voltage isolation.

In the past, attempts have been made to protect these components by using different materials for the component's housing. Example materials include those that have a greater yield and percentage elongation to try to better absorb energy in the event of a vehicle impact. Incorporating a change in material to the housing, however, may not be compatible with tooling, and can result in delayed manufacturing time.

Other ways to protect the high voltage component may include adding a physical blocking member or device around the component. Use of a physical blocking member, however, has not proven to be an effective way to protect the component.

SUMMARY

According to a first aspect of the present disclosure, there is provided a frame system for a vehicle including a high-voltage component. The frame system includes a pair of spaced apart primary rails that extend from a front of the vehicle toward a rear of the vehicle; a pair of longitudinally extending sills; an impact support rail that extends outward from each of the primary rails, and connects each respective primary rail to one of the sills; a cross-member that extends outward from each of the primary rails, and connects each respective primary rail to one of the sills; and a laterally extending frame support member that extends between the sills at a location between the impact support rails and the cross-members, wherein a pocket is collectively formed between each primary rail, the respective impact support rail, the respective sill, the respective cross-member, and the laterally extending frame support member, and the pocket is configured for receipt and protection of the high-voltage component.

According to the first aspect, the pair of spaced apart primary rails extend along a longitudinal axis of the vehicle and include a first section located at a front of the vehicle, a second section connected to the first section that extends in a direction toward the longitudinal axis, and a third section connected to the second section that extends toward the rear of the vehicle.

According to the first aspect, the impact support rail extends outward from each of the primary rails at a transition of the first section to the second section.

According to the first aspect, the impact support rail includes a first end fixed to the primary rail and a second end fixed to the sill, an angle between the sill and the second end being in the range of thirty to sixty degrees.

According to the first aspect, the first and second impact support rails are configured to direct energy received by the frame system during a vehicle impact in a direction away from the first and second high-voltage components.

According to the first aspect, the second end has a greater width than the first end.

According to the first aspect, the second and third sections of the primary rails forms a portion of the pocket.

According to the first aspect, each primary rail, each impact support rail, each sill, each cross-member, and the laterally extending frame support member are each formed from a rigid metal material.

According to a second aspect of the present disclosure, there is provided a frame system for a vehicle including a first high-voltage component and a second high-voltage component. The frame system includes a first primary rail and a second primary rail that extend from a front of the vehicle toward a rear of the vehicle; a first sill and a second sill; a first impact support rail that extends outward from the first primary rail, and connects the first primary rail to the first sill; a second impact support rail that extends outward from the second primary rail, and connects the second primary rail to the second sill; a first cross-member that extends outward from the first primary rail, and connects the first primary rail to the first sill; a second cross-member that extends outward from the second primary rail, and connects the second primary rail to the second sill; a laterally extending frame support member that extends between the first and second sills at a location between the first and second impact support rails and the first and second cross-members, wherein a first pocket is collectively formed between the first primary rail, the first impact support rail, the first sill, the first cross-member, and the laterally extending frame support member, the first pocket being configured for receipt and protection of the first high-voltage component; and wherein a second pocket is collectively formed between the second primary rail, the second impact support rail, the second sill, the second cross-member, and the laterally extending frame support member, the second pocket being configured for receipt and protection of the second high-voltage component.

According to the second aspect, the first and second primary rails extend along a longitudinal axis of the vehicle and include a first section located at a front of the vehicle, a second section connected to the first section that extends in a direction toward the longitudinal axis, and a third section connected to the second section that extends toward the rear of the vehicle.

According to the second aspect, the second and third sections of the first and second primary rails forms a portion of the first and second pockets, respectively.

According to the second aspect, the first and second primary rails, the first and second impact support rails, the first and second sills, the first and second cross-members, and the laterally extending frame support member are each formed from a rigid metal material.

According to the second aspect, the first and second impact support rails each extend outward from the first and second primary rails, respectively, at a transition of the first section to the second section.

According to the second aspect, the first and second impact support rails each include a first end fixed to the first and second primary rail, respectively, and a second end fixed to the first and second sill, respectively, and an angle between the second end and the first and second sill, respectively, is in the range of thirty to sixty degrees.

According to the second aspect, the first and second impact support rails are configured to direct energy received by the frame system during a vehicle impact in a direction away from the first and second high-voltage components.

According to the second aspect, the second end has a greater width than the first end.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
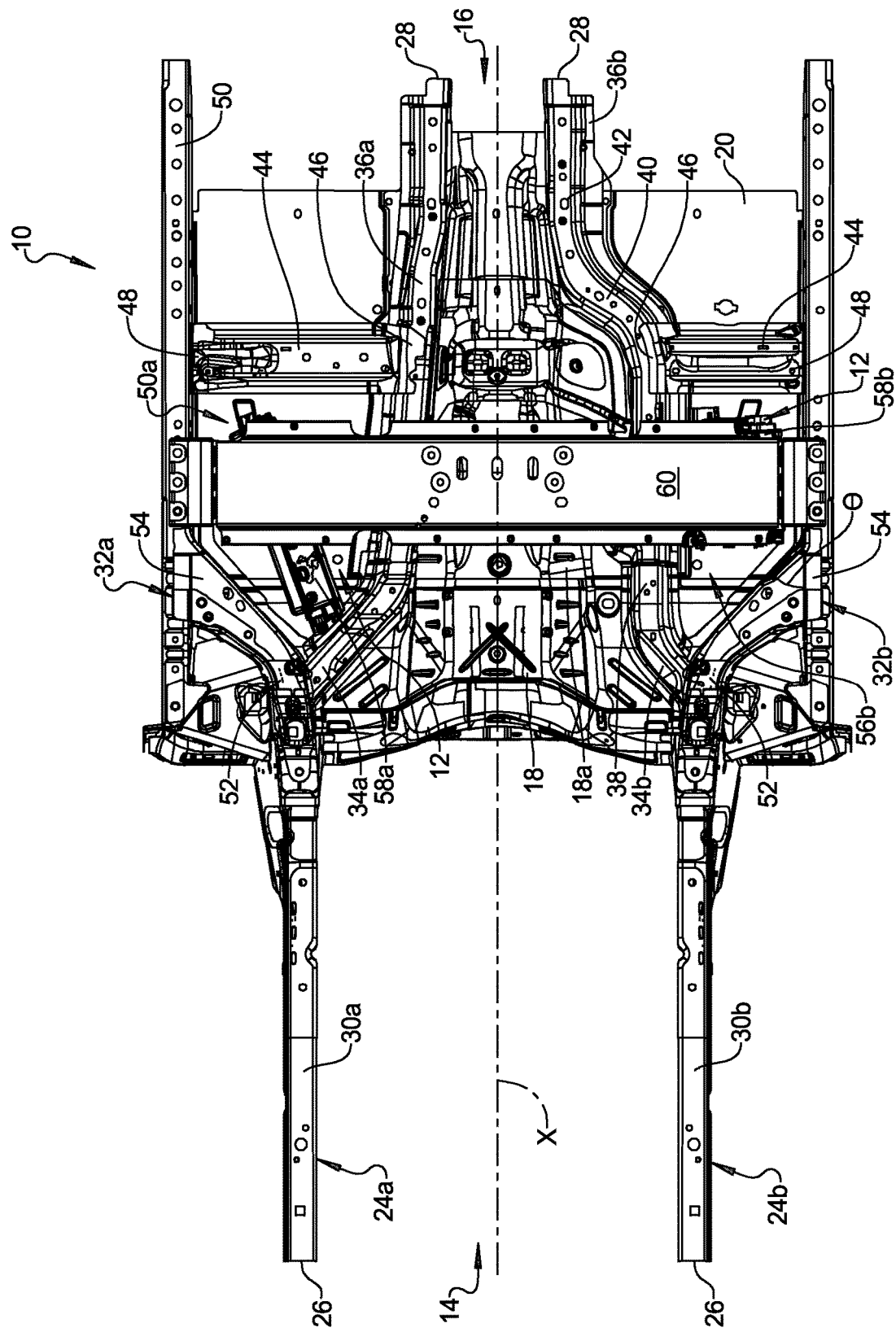
FIGS. 1 and 2 are isometric views of a vehicle frame system according to a principle of the present disclosure.
Figure 2:
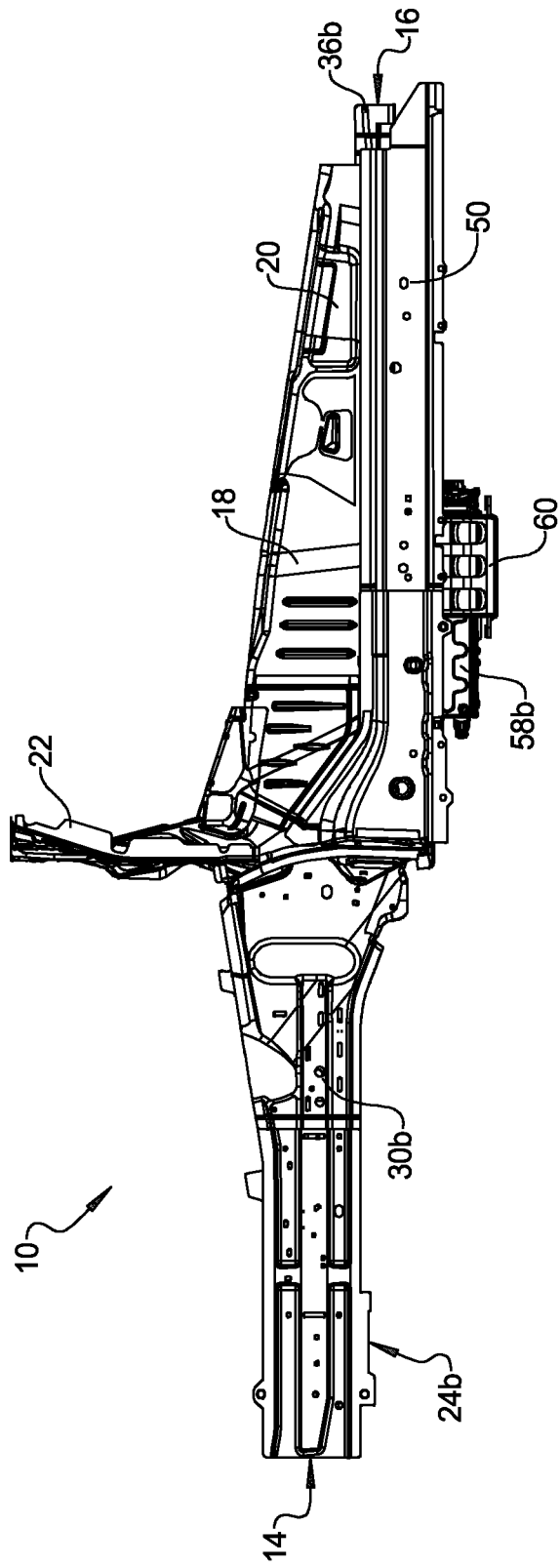
Figure 3:
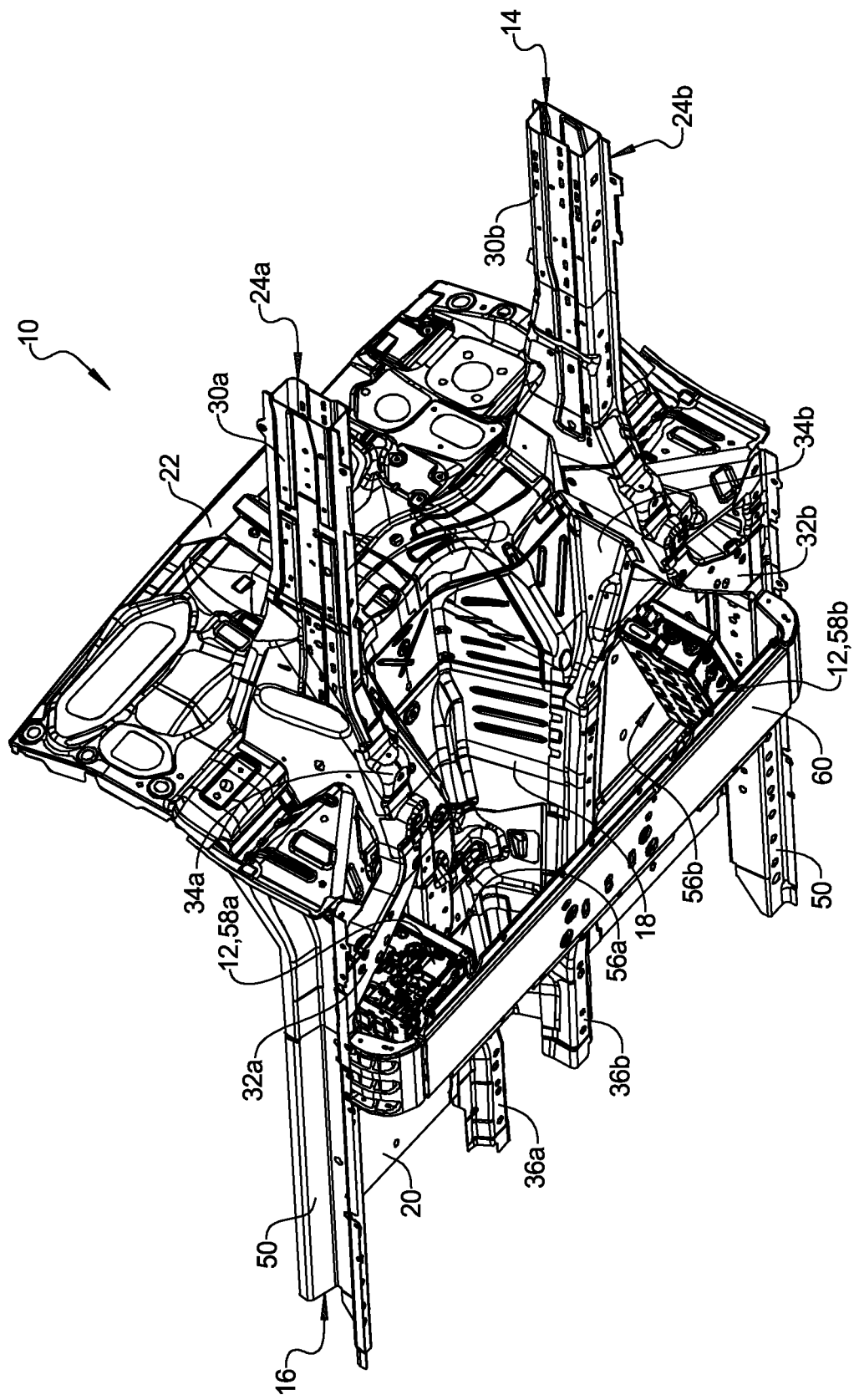
FIG. 3 is a bottom view of the vehicle frame system illustrated in FIGS. 1 and 2.
Figure 4:
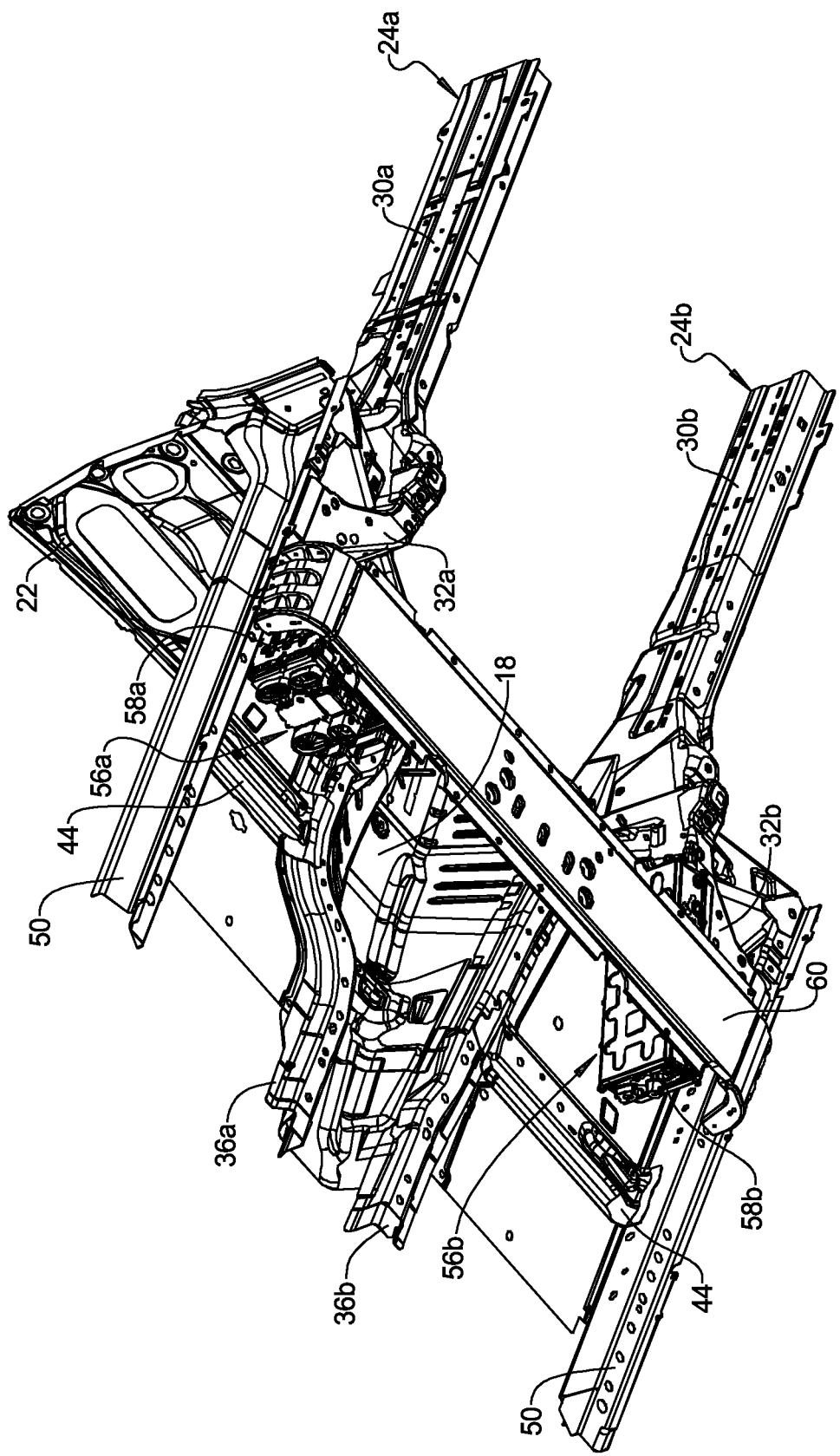
FIG. 4 is a side view of the vehicle frame system illustrated in FIGS. 1 and 2.

Referring to FIGS. 1 to 4, a partial view of a vehicle frame system 10 according to the present disclosure that is configured to protect at least one high voltage component 12 during a collision without sacrificing regulatory vehicle safety requirements is illustrated. Frame system 10 has a first end 14 that is configured to be located at a front of the vehicle and a second end 16 that is configured to be located at a rear of the vehicle. Frame system 10 is configured to support components of the vehicle such as a vehicle powertrain component 18, a floor 20 of a vehicle cabin (not illustrated), a firewall 22 (FIG. 2), and/or a floor of a vehicle bed (not illustrated).

Frame system 10 includes a pair of primary rails 24a, 24b that extend from first end 14 to second end 16. In this regard, primary rails 24a, 24b each have a first end 26 and an opposite second end 28. Primary rails 24a, 24b are preferably formed from a high-strength metal material such as steel, aluminum, or other alloy materials that are known to one skilled in the art. In the illustrated embodiment, primary rails 24a, 24b extend along an outer periphery 18a of the vehicle powertrain component 18. While each primary rail 24a, 24b may have the same configuration, it should be understood that to account for packaging restrictions imposed by various components of the vehicle such as the vehicle powertrain component 18, the configuration of each rail primary 24a, 24b may be different.

In this regard, as shown in the illustrated embodiment, primary rail 24a includes a first section 30a at front 14 of the vehicle, which is designed to absorb energy in the event of a frontal impact to front 14 of vehicle. In addition, first section 30a is configured to support a power source such an engine (not illustrated) of the vehicle. First section 30a is attached to an impact support rail 32a, which will be described in more detail later. A second section 34a of primary rail 24a extends from first section 30a at an acute angle from impact support rail 32a in a direction toward a center axis X of the vehicle. As second section 34a approaches powertrain component 18, the second section 34a transitions into a third section 36a of primary rail 24a that extends from second section 34a in a direction along center axis X toward second end 16 of the vehicle. Third section 36a does not extend in parallel with center axis X of the vehicle to account for the shape of powertrain component 18 such that increased protection for powertrain component 18 can be provided by primary rail 24a in the event of a vehicle impact. It should be understood, however, that third section 36a may extend in parallel with center axis X of the vehicle without departing from the scope of the present disclosure.

Similar to primary rail 24a, primary rail 24b also includes a first section 30b at front 14 of the vehicle, which is designed to absorb energy in the event of a frontal impact to front 14 of vehicle. In addition, first section 30b is configured to support a power source such an engine (not illustrated) of the vehicle. First section 30b is attached to another impact support rail 32b, which will be described in more detail later. A second section 34b of primary rail 24b extends from first section 30b at an acute angle from impact support rail 32b in a direction toward center axis X of the vehicle, and a third section 36b that extends from second section 34b in a direction along center axis X toward second end 16 of the vehicle. In the illustrated embodiment, third section 36b includes a first length 38 that extends substantially in parallel with center axis X of the vehicle to account for the shape of powertrain component 18. As primary rail 24b extends past powertrain component 18, the first length 38 of primary rail 22b transitions into a second length 40 that extends in a direction toward the center axis X of the vehicle, which then transitions into a third length 42 that extends along the center axis X in a manner similar to primary rail 24a. It should be understood, however, that an entirety of second section 34b may extend in parallel with center axis X of the vehicle without departing from the scope of the present disclosure.

A pair of cross-vehicle frame rails 44 extend outward from primary rails 24a, 24b in directions away from and orthogonal to center axis X of the vehicle. Cross-vehicle frame rails 44 increase the lateral stiffness of frame system 10, as well as assist in absorbing forces exerted in the event of a vehicle side impact. Similar to primary rails 24a, 24b, cross-vehicle frame rails 44 may be formed from a high-strength metal material such as steel, aluminum, or other alloy materials that are known to one skilled in the art. A proximate end 46 of each frame rail 44 is attached to a respective primary rail 24a, 2bb, and a distal end 48 of each frame rail 44 is attached to a sill 50 of the vehicle.

Impact support rails 32a, 32b are configured to absorb frontal and side impacts to the vehicle. As noted above, impact support rails 32a, 32b are connected to primary rails 24a, 24b, respectively. Each impact support rail 32a, 32b includes a first portion 52 attached to a respective primary rails 24a, 24b, and a second portion 54 that extends away from the respective primary rail 24a, 24b toward sill 50. Second portions 54 of impact support rails 32a, 32b are connected to sills 50 by welding or with a fastener. In the illustrated embodiment, the second portions 54 of impact support rails 32a, 32b are arranged relative to sills 50 at an acute angle θ, which may range between about thirty to about sixty degrees, and is preferably about forty-five degrees. Arranging second portions 54 relative to sills 50 at angle θ assists impact support rails 24a, 24b in absorbing side impacts to the vehicle. Although not required, it should be noted that a width of second portion 54 increases as it travels from primary rails 24a, 24b until second portion 54 meets sill 50. In other words, second portion 54 has a flared shaped that increases the rigidity of impact support member 32a, 32b. Similar to primary rails 24a, 24b and cross-vehicle frame rails 44, impact support rails 32a, 32b may be formed from a high-strength metal material such as steel, aluminum, or other alloy materials that are known to one skilled in the art.

The combination of impact support rail 32a, primary rail 24a, and cross-vehicle frame rail 44 collectively defines a pocket 56a that is configured for receipt of a first high-voltage component 58a. Similarly, the combination of impact support rail 32b, primary rail 24b, and cross-vehicle frame rail 44 collectively defines a pocket 56b that is configured for receipt of a second high-voltage component 58b. By positioning high-voltage components 58a, 58b in pockets 56a and 56b, respectively, each of the high-voltage components 58a, 58b will have increased protection in the event of a vehicle impact. Pockets 56a and 56b may be partially enclosed by a laterally extending support frame member 60, which further protects components 58a, 58b from impacts that may occur from below the vehicle (i.e., from impacts with that may occur when vehicle drives over uneven terrain). Frame member 60 may be formed from a high-strength metal material such as steel, aluminum, or other alloy materials that are known to one skilled in the art. High-voltage components 58a, 58b may be attached to frame member 60. Alternatively, high-voltage components 58a, 58b can be attached to primary rails 24a, 24b or floor 20. Example high-voltage components include a high-voltage power inverter module (PIM) and a high-voltage integrated DC module (IDCM).

The use of pockets 56a, 56b to protect high-voltage components 58a, 58b is important because when a high-voltage component 58a, 58b is damaged in a vehicle impact, high voltage isolation loss and battery shutdown may occur. It is paramount, therefore, to protect high-voltage components 58a and 58b from being damaged. In the illustrated embodiment, the risk of damage to high-voltage components 58a and 58b is substantially minimized due to the components being surrounded by the high-strength components of the vehicle frame system 10 in pockets 56a, 56b.

Moreover, due to impact support rails 32a and 32b being angled relative to sills 50, even if impact support members 32a and 32b are deformed during a vehicle impact, the deformation is likely to be to an extent where high-voltage components 58a and 58b are not damaged. Specifically, the angle θ between impact support rails 32a, 32b and sills 50 is selected such that in the event of an impact to vehicle, the energy received by the frame system 10 during a vehicle impact is directed in a direction away from the first and second high-voltage components 58a, 58b.

The use of vehicle frame system 10 also negates the need for high-voltage components 58a and 58b to be protected by a physical blocking member or device around the component, or using different materials for the component's housing. It should also be understood, that the use of frame system 10 to accommodate high-voltage components 58a and 58b also does not compromise desirable vehicle features such as cargo space, interior volume, vehicle dimensions, or vehicle appearance.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A frame system for a vehicle including a high-voltage component, comprising:
   a pair of spaced apart primary rails that extend from a front of the vehicle toward a rear of the vehicle;
   a pair of longitudinally extending sills;
   an impact support rail that extends outward from each of the primary rails, and connects each respective primary rail to one of the sills;
   a cross-member that extends outward from each of the primary rails, and connects each respective primary rail to one of the sills; and
   a laterally extending frame support member that extends between the sills at a location between the impact support rails and the cross-members,
   wherein a pocket is collectively formed between each primary rail, the respective impact support rail, the respective sill, and the respective cross-member,
   the pocket is configured for receipt and protection of the high-voltage component, and laterally surrounds the high-voltage component, and
   the laterally extending frame support member at least partially encloses a bottom of the pocket, and is configured to protect the high-voltage component from impacts that occur from below the vehicle.

2. The frame system according to claim 1, wherein the pair of spaced apart primary rails extend along a longitudinal axis of the vehicle and include a first section located at a front of the vehicle, a second section connected to the first section that extends in a direction toward the longitudinal axis, and a third section connected to the second section that extends toward the rear of the vehicle.

3. The frame system according to claim 2, wherein the impact support rail extends outward from each of the primary rails at a transition of the first section to the second section.

4. The frame system according to claim 3, wherein the impact support rail includes a first end fixed to the primary rail and a second end fixed to the sill, an angle between the sill and the second end being in the range of thirty to sixty degrees.

5. The frame system according to claim 4, wherein the first and second impact support rails are configured to direct energy received by the frame system during a vehicle impact in a direction away from the first and second high-voltage components.

6. The frame system according to claim 4, wherein the second end has a greater width than the first end.

7. The frame system according to claim 2, wherein the second and third sections of the primary rails forms a portion of the pocket.

8. The frame system according to claim 1, wherein each primary rail, each impact support rail, each sill, each cross-member, and the laterally extending frame support member are each formed from a rigid metal material.

9. A frame system for a vehicle including a first high-voltage component and a second high-voltage component, comprising:
- a first primary rail and a second primary rail that extend from a front of the vehicle toward a rear of the vehicle;
- a first sill and a second sill;
- a first impact support rail that extends outward from the first primary rail, and connects the first primary rail to the first sill;
- a second impact support rail that extends outward from the second primary rail, and connects the second primary rail to the second sill;
- a first cross-member that extends outward from the first primary rail, and connects the first primary rail to the first sill;
- a second cross-member that extends outward from the second primary rail, and connects the second primary rail to the second sill;
- a laterally extending frame support member that extends between the first and second sills at a location between the first and second impact support rails and the first and second cross-members,
- wherein a first pocket is collectively formed between the first primary rail, the first impact support rail, the first sill, the first cross-member, and the laterally extending frame support member, the first pocket being configured for receipt and protection of the first high-voltage component; and
- wherein a second pocket is collectively formed between the second primary rail, the second impact support rail, the second sill, the second cross-member, and the laterally extending frame support member, the second pocket being configured for receipt and protection of the second high-voltage component.

10. The frame system according to claim 9, wherein the first and second primary rails extend along a longitudinal axis of the vehicle and include a first section located at a front of the vehicle, a second section connected to the first section that extends in a direction toward the longitudinal axis, and a third section connected to the second section that extends toward the rear of the vehicle.

11. The frame system according to claim 10, wherein the second and third sections of the first and second primary rails forms a portion of the first and second pockets, respectively.

12. The frame system according to claim 10, wherein the first and second primary rails, the first and second impact support rails, the first and second sills, the first and second cross-members, and the laterally extending frame support member are each formed from a rigid metal material.

13. The frame system according to claim 10, wherein the first and second impact support rails each extend outward from the first and second primary rails, respectively, at a transition of the first section to the second section.

14. The frame system according to claim 13, wherein the first and second impact support rails each include a first end fixed to the first and second primary rail, respectively, and a second end fixed to the first and second sill, respectively, and an angle between the second end and the first and second sill, respectively, is in the range of thirty to sixty degrees.

15. The frame system according to claim 13, wherein the first and second impact support rails are configured to direct energy received by the frame system during a vehicle impact in a direction away from the first and second high-voltage components.

16. The frame system according to claim 13, wherein the second end has a greater width than the first end.

* * * * *